UNITED STATES PATENT OFFICE.

ALFRED GORDON SALAMON, OF LONDON, ENGLAND, ASSIGNOR TO THE BRITISH URALITE COMPANY, LIMITED, OF LONDON, ENGLAND.

MANUFACTURE OF REFRACTORY MATERIALS FOR BUILDING OR OTHER PURPOSES.

SPECIFICATION forming part of Letters Patent No. 689,129, dated December 17, 1901.

Application filed February 15, 1900. Serial No. 5,376. (No specimens.)

*To all whom it may concern:*

Be it known that I, ALFRED GORDON SALAMON, consulting chemist, a subject of the Queen of Great Britain, residing at London, England, have invented certain new and useful Improvements in the Manufacture of Refractory Materials for Building or other Purposes, of which the following is a specification.

This invention has for its object the production of an improved refractory material suitable for use in building and for other purposes as a substitute for slate, plaster, wood, corrugated iron, and other substances.

In the specification of former Letters Patent No. 631,719, granted to A. Imschenetzky and dated August 22, 1899, there is described the production of a refractory material wherein chalk or other kindred substances and asbestos are cemented together by gelatinous silica, which latter is precipitated onto the fibers of asbestos and onto the particles of chalk from a solution of silicate of soda by means of a solution of bicarbonate of soda. The product of this process is subsequently dried.

My present invention comprises an improved process of producing refractory material of the kind described in the said former specification whereby I avoid wholly or in part the employment of the bicarbonate of soda, thus effecting a considerable economy in production. In my improved process I add less chalk or kindred substances than would otherwise be used, and I effect a chemical precipitation of chalk along with the gelatinous or colloidal silica amid and upon the fibers of the asbestos and the granules or fragments of the chalk or kindred substances mixed with the asbestos, whereby the amalgamation of the constituents of the product is rendered more complete and when the drying is effected a stronger material is obtained than is possible by the process described in the above-mentioned specification.

In carrying out my improved process I pass carbonic-acid gas into water in which chalk is suspended, continuing the passage of this gas until the chalk has disappeared and the solution is fluid and substantially clear. I then use this liquid for saturating the asbestos which has been previously mixed with chalk or kindred substances and impregnated with sodium-silicate solution. The result is the decomposition of the silicate of soda, with the production of gelatinous silica and the simultaneous production of chemically-precipitated chalk within the pores of the asbestos and upon the particles of chalk. The operation is continued and may be repeated until all the silicate of soda has been decomposed, whereupon the monocarbonate of soda is washed out of the refractory material and the latter is subsequently dried. The monocarbonate of soda thus produced can be made available in the arts according to methods well known to chemists. Though bicarbonate of soda is practically the most useful I may employ, as Imschenetzky points out, potassium or ammonium bicarbonate.

I can carry out my invention as above described without the use of bicarbonate of soda for separating the colloidal silica, but I find it is more advantageous first to use sodium bicarbonate, following the silicate of soda, while the material is in a soft condition, and then to roll or press and dry the material and soak in silicate of soda again, after which I apply my calcium-bicarbonate solution to the hardened sheets, thereby obtaining a deposition of calcium carbonate and colloidal silica in the said sheets. Any of these processes may be repeated, if desired. These sheets become considerably harder when thus prepared than when sodium bicarbonate alone is used. The reason for this is that calcium silicates are produced under these conditions more readily than when colloidal silica is left to act slowly upon calcium carbonate naturally produced, or, in other words, upon chalk, whereas in my process the calcium carbonate is generated by a chemical reaction with the elimination of carbonic acid from the bicarbonate and may, with strict accuracy, be described as being in the nascent condition, whereby it is, as is well known to chemists, more capable of entering into such a reaction as would lead to the formation within the material of calcium silicates. In lieu of calcium bicarbonate I may of course employ the bicarbonate of any other alkaline earth, as strontium or magnesium, which has a substantially soluble bicarbonate and a substantially insoluble monocarbonate.

The improved material produced as above described can be used not only for building purposes, but also as an available shield for field-guns and in shipbuilding and for a variety of other purposes.

What I claim is—

1. A process of agglomerating permeable fire-resisting material, consisting in impregnating the same with a solution of a soluble silicate and afterward acting upon the said material with a solution of calcium bicarbonate, substantially as, and for the purposes, hereinbefore described.

2. A process of agglomerating permeable fire-resisting material, consisting in impregnating the same with a solution of a soluble silicate and afterward acting upon the said material with a soluble bicarbonate of an alkaline earth, substantially as described.

3. The process of manufacturing refractory materials which consists in producing the same in sheets or other forms, impregnating the same with a solution of a soluble silicate, and afterward soaking them in a bath of chalk held in solution by carbonic acid in excess, substantially as described.

4. The process of manufacturing refractory materials which consists is producing sheets or other forms from asbestos pulp mixed with chalk, impregnating the same with a solution of sodium silicate, and afterward simultaneously precipitating colloidal silica and calcium carbonate within the fabric upon the particles of the asbestos and chalk by acting upon the soluble silicate with a solution of calcium bicarbonate, substantially as described.

5. The process of manufacturing refractory materials, which consists in producing sheets or other forms from asbestos pulp mixed with chalk, saturating the said articles with a soluble silicate, and then soaking the same in a bath of a soluble bicarbonate of an alkaline earth, substantially as described.

6. The process of manufacturing refractory materials which consists in suitably impregnating the same with soluble silicate, and then immersing the impregnated material in a bath consisting of chalk, water and carbonic-acid gas, substantially as herein shown and described.

7. As a new article of manufacture, refractory material made of asbestos mixed with chalk, upon the particles of which colloidal silica, and a carbonate of an alkaline earth are deposited, substantially as described.

8. As a new article of manufacture, refractory material made of asbestos mixed with chalk, upon the particles of which colloidal silica, and calcium carbonate are deposited, substantially as described.

In witness whereof I have hereunto set my hand in presence of two witnesses.

ALFRED GORDON SALAMON.

Witnesses:
ERNEST GOLDIE,
HORACE H. BEARD.